United States Patent Office 2,823,858
Patented Feb. 18, 1958

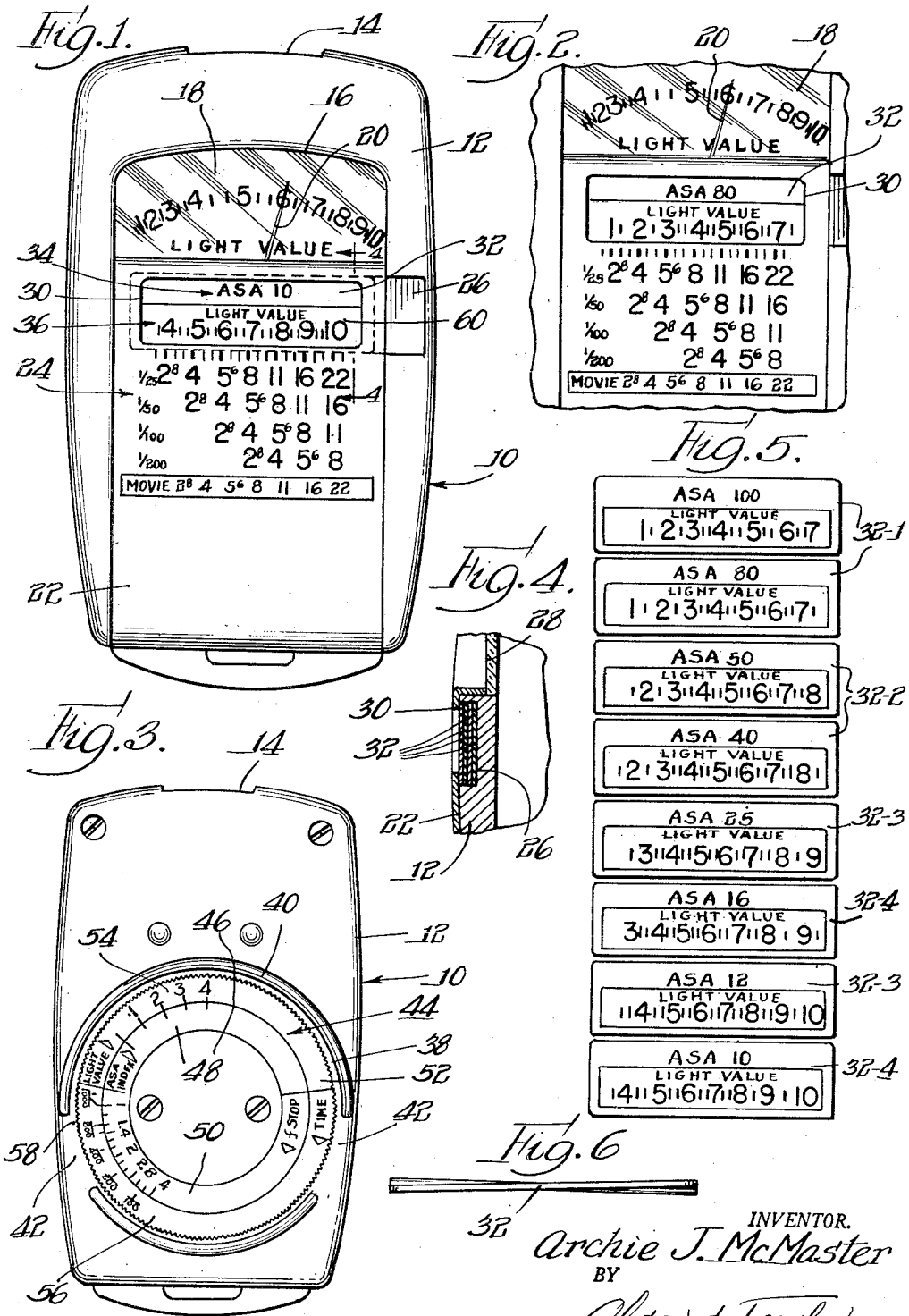

2,823,858

EXPOSURE METER COMPUTING DEVICE

Archie J. McMaster, Deerfield, Ill., assignor to G-M Laboratories Inc., Chicago, Ill., a corporation of Illinois Application July 29, 1953, Serial No. 371,076

6 Claims. (Cl. 235—64.7)

This invention is concerned generally with a photographic exposure meter, and more particularly with a computing device therefor.

In order to obtain satisfactory photographic exposures it is necessary to determine in some manner the actinic value of the light illuminating the scene to be photographed. Under some conditions, and with films having relatively large exposure latitudes, experienced photographers can determine the light value sufficiently closely by visual observation. However, most people cannot determine light values with sufficient accuracy, and it is rare that anyone can visually determine the light value with sufficient accuracy for use with present day color films which, as is well known, have very small exposure latitudes.

Various types of photographic exposure meters have been developed for determining the actinic value of the light. The most satisfactory meters are those utilizing photoelectric cells and accompanying galvanometer movements for determining and indicating the value of the light. The light value then must be correlated with the emulsion speed or light sensitivity of the film being used to ascertain satisfactory combinations of shutter speeds and lens openings.

Many correlating devices or computers have been developed heretofore which are quite comprehensive and which are entirely satisfactory when used by an experienced photographer. However, most of the comprehensive computers have been beyond the scope of the skill of beginning photographers, and it is precisely such persons who have the greatest need of exposure meters. Some efforts have been made to produce simplified computing devices which generally are useful only with films (or plates) having a predetermined emulsion speed. If a film having a different speed is to be used, it has been necessary to switch the entire computing mechanism. This requires a relatively bulky apparatus and one which is susceptible of accidentally erroneous use. Furthermore, such computers have failed to give a full range of exposure combinations, i. e., corresponding shutter speeds and lens openings.

Some efforts have been made to produce direct reading photoelectric exposure meters in which, when properly preset, one or more possible exposure combinations are indicated directly by the galvanometer pointer. These computers have not been entirely satisfactory as the characteristics of the photocells and galvanometer movements now used have resulted in scales which are crowded in some parts and expanded in others. It is very difficult to indicate the proper exposure combinations in the crowded scale parts.

The primary object of this invention is to provide a photographic exposure meter avoiding the above noted difficulties in the prior art.

Another object of this invention is to provide in a photographic exposure meter, a computer in which the range of exposure combinations remains constant, and in which it is necessary to change only a scale corresponding to the film speed in switching from one film speed to another.

A more specific object of this invention is to provide a computer as set forth in the last preceding object in which replaceable slides corresponding to the various conventional film speeds are selectively cooperable with a fixed combination of shutter speeds and lens openings.

A further object of this invention is to provide, in a photographic exposure meter, the combination of a quickly readable computer corresponding at any given time to a single film speed, and a comprehensive computer indicating exposure combinations possible with all film speeds.

Again, another object of this invention is to provide a photographic exposure meter having a computer indicating at a glance if the light value is within the capabilities of the camera for the particular type of film in use.

Other and further objects and advantages of the present invention will be apparent from the following description when taken in connection with the accompanying drawings wherein—

Fig. 1 is a top view of an exposure meter incorporating the principles of my invention and illustrating the computer as set up for use with film of a particular emulsion speed;

Fig. 2 is a fragmentary view similar to Fig. 1 showing the computer set up for use with a film having a different emulsion speed;

Fig. 3 is a bottom view of an exposure meter showing the comprehensive computer;

Fig. 4 is a cross-sectional view along the line 4—4 showing the slides in place;

Fig. 5 is a layout view showing the faces of all of the slides in alignment; and Fig. 6 is an end view on a greatly enlarged scale of one of the slides.

The photoelectric meter is shown generally in Fig. 1 and is identified by the numeral 10. The meter includes a two-piece case or housing 12 which preferably is formed of molded plastic. The housing is provided at the front end thereof with a window 14 behind which is housed a self-generating photoelectric cell of any known or suitable construction. The housing 12 is provided with a window 16 in its top surface, and a light value scale 18 having indicia corresponding to light values and arbitrarily numbered 1 through 10 is visible through this window. A pointer or needle 20 is arranged to move across the light value scale 18 in accordance with the current supplied to the galvanometer movement to which the pointer is attached, this current being generated by the photoelectric cell and being proportional to the actinic value of the light falling upon the scene at which the meter is aimed.

The top of the meter housing is provided with a plate 22 which may be of any suitable material, preferably metal, and which is preferably recessed in the upper surface of the housing. The plate 22 is provided adjacent its midsection with a scale or table 24 showing a predetermined combination of shutter speeds and lens openings. Most inexpensive cameras of the type generally used by amateurs have shutter speeds ranging from 1/25 through 1/200 of a second, and these values appear in the lefthand vertical column of the scale or table 24. A fifth value is provided at the bottom for motion picture cameras and is labeled "Movie," and is suitable for use with the usual 1/30 to 1/40 of a second exposures commonly found in amateur motion picture cameras.

Most cameras of the type utilized by amateurs have maximum lens openings of $f/3.5$, occasionally $f/2.8$. The minimum apertures on such cameras run from f/16 to f/22. Accordingly, the lens opening values on the scale or table 24 are limited to these values, which are disposed in horizontal rows adjacent the accompanying shutter speed values. It will be noted that the successive rows are similar except that the numerals are offset one space to the right each time the shutter speed is increased, as the lens opening numerals correspond to successive stops, and the opening must be increased by one stop each time the shutter speed is doubled. The scale or table 24 is fixed and permanent and it is comprised of all of the exposure combinations generally possible on an amateur camera of the inexpensive types without reverting to time exposures.

The housing 12 is provided in its upper surface with a transverse recess 26 shown in Figs. 1, 2 and 4, Fig. 4 also showing the glass 28 in the window 16 protecting the scale 18 and pointer 20. The plate 22 is provided with a rectangular opening 30 overlying the recess 26. It will be seen that the recess 26 opens outwardly of the housing on the right side thereof, but terminates beneath the plate 22 on the left side.

A plurality of metallic slides 32 is replaceably mounted in the recess 26. Each of these slides, for example four, is provided along its top edge with a label 34 indicating the film speed to which the face of the slide corresponds. For instance, in Fig. 1 the label 34 identifies the face of the slide as being for use with a film having an emulsion speed of 10, as established by the American Standards Association. The bottom part of each slide face is provided with a light value scale or table 36 corresponding to a portion of the light value scale 18 and having the numerals thereof in vertical alignment with the lens opening indicia of the scale or table 24 in accordance with the film speed of the slide 32.

Each of the slides 32 as best may be seen in Fig. 6 showing the end view of one of the slides, is twisted about its longitudinal axis, all of the slides being twisted in the same direction. The slides are formed of resilient material, preferably metal, and the twist in the slides causes them to wedge resiliently in the recess 26 beneath the plate 22 when all of the slides are in the recess, as shown in Fig. 4. This resilient wedging of the slides in place prevents them from being accidentally displaced from the recess, but allows them to be slidingly removed from the recess readily by engagement with the photographer's thumb or finger.

The films in common amateur use vary in emulsion speed from 10 through 100, according to the film speeds established by the American Standards Association. Eight film speeds are enough to encompass all of the commonly used film speeds including the ratings for daylight and artificial light. All of these film speeds are incorporated on four slides and are placed on the fronts and backs thereof.

The faces of the slides are shown in Fig. 5. One of the slides, identified as 32-1 bears film speed ratings of 100 and 80. A second slide identified as 32-2 corresponds to film speeds of 50 and 40. The third slide 32-3 corresponds to film speeds 25 and 12, while the fourth slide 32-4 represents film speeds 16 and 10. The faces of the several slides have been lined up vertically in Fig. 5 to show that the numerals corresponding to the light values thereon are similarly spaced and correspond to the figures on the light value scale 18, the only difference being that the numerals are progressively offset to the left with decreasing film speed ratings. For example, the face of the slide 32-1 corresponding to a film speed of 100 has numerals of the light scale from 1 through 7, while the face of the slide 32-4 corresponding to a film speed of 10 bears numerals 4 through 10. The faces corresponding to the intermediate film speeds have the numbers correspondingly progressing.

Since the light value numerals are properly offset from one face to another of the slides 32, it is only necessary to change the slides when changing from one film speed to another, and the scale or table 24 remains constant. It is easy to tell at a glance whether the light value indicated by the pointer 20 is on the slide 32. If the light value is on the slide, such as value number 6 indicated in Figs. 1 and 2, then the light is adequate for taking a picture with a conventional amateur camera and the particular film in use. It will be noted from Figs. 1 and 2 that the light value 6 is adequate for use with a film such as Kodachrome having a film speed of ASA 10, and is also adequate for artificial light exposures of Super XX having a tungsten speed value of ASA 80.

Occasionally the light value as indicated by the pointer 20 will not appear on the face of the slide 32 corresponding to the film in use. For instance, in Fig. 1 if the pointer 20 indicated a light value of 3 or less, it would be immediately apparent that an instantaneous exposure could not be made with a camera of the type previously outlined. In such an eventuality the meter 10 is simply turned over. The back of the meter case 12 is provided with a recess 38 having a raised bead 40 which is interrupted on substantially opposite sides at 42. A conventional slide rule type of computer 44 is mounted in this recess and includes a central fixed member 46 of circular configuration having film speed indicia 48 along its upper edge, and lens opening indicia 50 along its lower edge.

A ring 52 is positioned beneath the circular member 46 and is spring pressed up against this member. The ring bears light value indicia 54 from 1 to 10 corresponding to the full scale 18. The ring bears indicia 56 along its lower edge corresponding to shutter speeds from one thousandth of a second to a relatively long time exposure of sixteen seconds. The light value indicated on the portion 54 of the ring can be lined up with the film speed as indicated on the portion 48 of the member 46 regardless of the light value and the film speed by rotating the ring. The periphery of the ring is knurled as indicated at 58, and this knurled periphery is readily engageable by a thumb or finger in the discontinuities 42 in the bead 40 for rotating the ring. As previously indicated, the light value scale 54 has the full range of numerals from 1 to 10. The film speed scale 48 corresponds to emulsion speeds from ASA 0.8 to 800, thus encompassing special types of films as well as those normally used. It has been indicated that the shutter speed scale runs from one thousandth of a second to sixteen seconds. The lens opening scale 50 runs from f/1 to f/64, thus covering lens openings and shutter speeds for any type of camera.

Accordingly exposures for most cameras and for most films and light values can be obtained instantaneously from the scale or table 24 and the properly inserted slide 32, the slide being changed each time film of a different speed is brought into use. For extraordinary combinations of film speeds and light values, and with extraordinary cameras, all that is necessary is to turn the meter over for obtaining a large number of combinations of shutter speeds and lens openings.

The faces of the slides 32 are made quickly readable. Thus, the top part of each slide bearing the film speed indicia 34 comprises bare metal with the film speed indicia stamped into the metal and appropriately colored. The lower portion of the scale bearing the light values 36 is depressed throughout the area indicated at 60 and preferably is dark colored for contrast with the top part of the slide. The indicia 36 are raised from the depressed portion 60 to the level of the top part of the slide, and conveniently are left as bare metal. This surface configuration of the slides prevents any of the indicia from wearing away as the slides are slid into and out of place.

It will be seen that the exposure meter herein disclosed is quickly and simply operated by even the most inexperienced photographer. It is not necessary to change an entire scale when film of a different emulsion speed is used and no parts of the exposure indicating scales are crowded. The photographer can tell at a glance if the light is suitable for use with an inexpensive camera and the particular film in use. By simply turning over the meter the photographer can find a large number of possible exposure combinations regardless of the type of film and the capabilities of the camera.

The specific example herein shown and described is by way of illustration. Various changes in structure can be effected and comprise a part of the invention insofar as they fall within the spirit and scope of the appended claims.

I claim:

1. In a photographic exposure meter having a casing and scale means for indicating light intensity over a substantially continuous range, the combination of means providing fixed scales on said casing bearing lens opening and shutter speed combinations, and means providing a narrow slideway on said casing, said slideway being open at one end for receiving an indicia bearing slide and forming an elongated window at the top for exposing the indicia on said slide in relation to and for cooperation with said fixed scales.

2. A photographic exposure meter as set forth in claim 1 and further including a slide removably received in said slideway and bearing a scale corresponding to a predetermined film emulsion speed and having indicia corresponding to at least a part of the range of said light indicating means in accordance with the film emulsion speed to which said slide corresponds, the indicia on said slide being cooperable with the fixed scale to determine correct exposures.

3. A photographic exposure meter as set forth in claim 2 and including a plurality of slides bearing different indicia each corresponding to a different part of the range of said light indicating means in accordance with the film emulsion speed to which each slide corresponds, the plurality of slides cooperating to support a selected one in viewing position in said slideway.

4. A photographic exposure meter comprising a casing, fixed scales on said casing bearing lens opening and shutter speed combinations, and receptacle means providing a narrow slideway on said casing for receiving an indicia bearing slide and provided with a window opening juxtaposed and longitudinally substantially coextensive with said fixed scales for exposing the indicia on the slide in relation to and for cooperation with said fixed scales.

5. A photographic exposure meter as claimed in claim 4, wherein the receptacle means is of sufficient depth to receive a plurality of superposed and interchangeable indicia bearing slides corresponding to different emulsion speeds and arranged as a stack exposing the indicia on one slide at a time through said window opening.

6. A photographic exposure meter as claimed in claim 5, wherein each slide is twisted longitudinally of its axis for interfitting relationship resiliently wedging the slides against accidental displacement.

References Cited in the file of this patent

UNITED STATES PATENTS

| | | |
|---|---|---|
| 384,526 | Isbell | June 12, 1888 |
| 424,356 | Romaine | Mar. 25, 1890 |
| 854,888 | Hartman | May 28, 1907 |
| 1,276,532 | Hubbard | Aug. 20, 1918 |
| 1,288,395 | Duncan | Dec. 17, 1918 |
| 2,172,528 | Auer | Sept. 12, 1939 |
| 2,247,763 | Meyers | July 1, 1941 |
| 2,308,469 | McMaster | Jan. 12, 1943 |
| 2,529,337 | Hickok | Nov. 7, 1950 |
| 2,550,936 | Poirette | May 1, 1951 |
| 2,645,178 | Brainard et al. | July 14, 1953 |